US009740461B2

(12) United States Patent
Peleg

(10) Patent No.: US 9,740,461 B2
(45) Date of Patent: Aug. 22, 2017

(54) SYSTEM AND METHOD FOR EXECUTING USER CHANNEL PROGRAMS ON MAINFRAME COMPUTERS

(71) Applicant: MODEL9 SOFTWARE LTD., Kiryat Ono Ot (IL)

(72) Inventor: Gil Peleg, Kiryat Ono (IL)

(73) Assignee: MODEL9 SOFTWARE LTD., Kiryat Ono (IL)

( * ) Notice: Subject to any disclaimer, the term of this patent is extended or adjusted under 35 U.S.C. 154(b) by 0 days.

(21) Appl. No.: 14/971,080

(22) Filed: Dec. 16, 2015

(65) Prior Publication Data

US 2017/0177306 A1   Jun. 22, 2017

(51) Int. Cl.
*G06F 9/44* (2006.01)

(52) U.S. Cl.
CPC .................................. *G06F 8/315* (2013.01)

(58) Field of Classification Search
CPC ....................................................... G06F 8/315
See application file for complete search history.

(56) References Cited

U.S. PATENT DOCUMENTS

| 6,704,926 | B1 | 3/2004 | Blandy |
| 2004/0210581 | A1* | 10/2004 | Schwartz .......... G06F 17/30557 |
| 2009/0100402 | A1 | 4/2009 | Heuler |
| 2011/0173640 | A1* | 7/2011 | Kreuzenstein ............ G06F 9/54 |
| | | | 719/328 |
| 2011/0282846 | A1* | 11/2011 | Shepard .............. G06F 11/0727 |
| | | | 707/687 |
| 2012/0271868 | A1* | 10/2012 | Fukatani ............... G06F 3/0608 |
| | | | 707/822 |
| 2013/0125093 | A1 | 5/2013 | Mandava |
| 2013/0132947 | A1* | 5/2013 | Falby .................. G06F 9/44505 |
| | | | 718/1 |
| 2014/0089941 | A1 | 3/2014 | Ho |

* cited by examiner

*Primary Examiner* — Viva Miller
(74) *Attorney, Agent, or Firm* — Koffsky Schwalb LLC; Mark I. Koffsky

(57) ABSTRACT

A method, apparatus and computer program product, the method comprising: opening a storage volume associated with a mainframe computer executing z/OS operating system; obtaining access to a required area of the storage volume; receiving a call from a program programmed in a high level programming language and executed on the mainframe computer, to execute a user channel program, wherein the user channel program may refer to any location within the required area of the storage volume; and processing the user channel program to obtain channel command words and provide the channel command words to Execute Channel Program (EXCP).

16 Claims, 5 Drawing Sheets

```
//JAVALKED JOB ACCT#,SYSPROG,TIME=NOLIMIT,REGION=0M,
// NOTIFY=&SYSUID,MSGLEVEL=(1,1),MSGCLASS=X
//*
//LKED    EXEC PGM=IEWL,
// PARM='MAP,AMODE=31,RMODE=ANY,DYNAM=DLL,CASE=MIXED,AC=1'
//SYSLIB   DD DISP=SHR,DSN=CEE.SCEELIB
//SYSLMOD  DD DISP=SHR,DSN=OSBZ.PDSE.LOAD
//SYSPRINT DD SYSOUT=*
//SYSLIN   DD DISP=SHR,DSN=SYS1.SIEALNKE(JVMLDM70)
//         DD *
 INCLUDE SYSLIB(CELHS003)
 INCLUDE SYSLIB(CELHS001)
 INCLUDE SYSLIB(CELHSCPP)
 INCLUDE '/usr/lpp/java/J7.0/bin/j9vm/libjvm.x'
 NAME    JVMLDM7A(R)
/*
```

FIG. 3B

```
STORAGE    OBTAIN,LENGTH=DISKOPEN_DCBAREA_LENGTH,ADDR=(R4)
       LOC=BELOW
       USING   DISKOPEN_DCBAREA,R4
* STORE JFCB CODE AND JFCB AREA ADDRESS IN DCB EXIT LIST
       LA      R5,INDCBLST
       USING EXLST,R5
       MVI     EXLCODES,EXLRJFCB+EXLLASTE
       LA          R6,JFCBAREA
       STCM R6,B'0111',EXLENTRB
       DROP    R5
* INITIALIZE DCB AND DCBE
       MVC    INDCB(MODLDCB_LEN),MODLDCB
       MVC    INDCBE(MODLDCBE_LEN),MODLDCBE
* POINT DCB TO DCBE AND DCB EXIT LIST
       LA          R5,INDCB
       USING   IHADCB,R5
       MVC    DCBDDNAM(8),0(R8)
       LA          R6,INDCBE
       ST          R6,DCBDCBE
       LA          R6,INDCBLST
       ST          R6,DCBEXLST
* READY FOR RDJFCB
       MVC    RDJFCBPL(MODL_RDJFCB_LEN),MODL_RDJFCB
       RDJFCB ((R5)),MF=(E,RDJFCBPL)
       LTR         R15,R15
       JZ          RDJFCBOK
       ABEND 100,DUMP
* UPDATE JFCB TO REPRESENT THE VTOC
       RDJFCBOK    DS 0H
       LA          R6,JFCBAREA
       USING JFCB,R6
       MVC    JFCBDSNM,VTOCDSN
       DROP    R6
* OPEN THE VTOC
       MVC    OPENPL(MODL_OPEN_LEN),MODL_OPEN
       OPEN   ((R5)),TYPE=J,MF=(E,OPENPL)
* MODIFY DEB TO ALLOW I/O TO ANY TRACK ADDRESS
       L           R6,DCBDEBAD
       AHI         R6,DEBBASND-DEBBASIC
       USING   DEBDASD,R6
       MODESET  MODE=SUP,KEY=ZERO
       MVC    DEBSTRCC,=X'0000'
       MVC    DEBSTRHH,=X'0000'
       MVC    DEBENDCC,=X'FFFF'
       MVC    DEBENDHH,=X'FFFF'
       MVI     DEBNMTRKHI,X'FF'
       MVC    DEBNMTRK,=X'FFFF'
       MODESET  MODE=PROB,KEY=NZERO
       DROP    R6
```

SYSTEM AND METHOD FOR EXECUTING USER CHANNEL PROGRAMS ON MAINFRAME COMPUTERS

TECHNICAL FIELD

The present disclosure relates to mainframe computers in general, and to a system and method for performing various storage and retrieval operations on a mainframe from a modern development platform, in particular.

BACKGROUND

Disk operations, such as but not limited to storage and retrieve operations, are an essential part in almost any operation of computer systems. This is especially true for large organizations maintaining large databases comprising information related for example to customers, suppliers, inventory documents or the like. Many of these organizations use legacy systems, such as mainframe computers. However, such legacy systems generally do not provide interface to disk operations from programs developed in modern development environments and high level programming languages, such as Java. Even further, some operations require specific privileges which may not be obtained by programs in high level programming languages.

US2014089941 discloses a mechanism for collecting one or more performance metrics. A plurality of source code instructions is provided, which include a plurality of macro calls, each including a plurality of predetermined parameters. A plurality of object code instructions corresponding to the plurality of source code instructions is executed. In response to receiving a signal identifying at least one of the plurality of macro calls contained in the source code instructions and identifying a desired level of granularity, performance metrics are collected using the identified macro call in accordance with the desired level of granularity.

US2013125093 discloses a method for generating an object oriented programming language source code from a simulation model, which includes receiving the simulation model, generating header files from the simulation model, in a general programming language, generating bridge code that aids in generating object-oriented programming language templates that include template maps, generating object-oriented programming language components from the template maps, aggregating the object-oriented programming language components; and generating object-oriented programming language source code and wrappers from aggregating the object-oriented programming language components.

U.S. Pat. No. 6,704,926 discloses A process in a data processing system for just-in-time compiling instructions. A set of nonspecific data processing system instructions for a method are received. Addresses are placed into a set of functions. The set of nonspecific data processing system instructions are processed using an intermediate code generation process to generate a set of instructions for execution using a particular mode of addressing.

US2013132947 discloses a computer implemented method for creating an execution path for interfacing with legacy programs in a mainframe computing environment. The method includes: creating a runtime environment for programs on a mainframe computer by an initiator program; initiating execution of a configuration program in the runtime environment by the initiator program, where the configuration program is written in the high level programming language; specifying user-defined parameters for a Java Virtual Machine (JVM) to the configuration program; and creating a JVM in another runtime environment of the mainframe computer, where the JVM is created by the configuration program using the user-defined parameters.

US2009100402 discloses a system for building configurable application in various embodiments. The system may include a distributed tier with a presentation module accessible by a user which is configured to permit configuration of an interface in a session with the user and an interface module configured to process session state data in an extensible language format. The system may also include a mainframe system having an enterprise architecture integration (EAI) framework configured for receiving the extensible language formatted state data and invoking at least one service in association with evaluating the extensible language formatted state data and a business rules engine based on an extensible language format. The mainframe system may be configured to translate the evaluated state data into a reply message based on the extensible language format.

BRIEF SUMMARY

One exemplary embodiment of the disclosed subject matter is a computer-implemented method comprising: opening a storage volume associated with a mainframe computer executing z/OS operating system; obtaining access to a required area of the storage volume; receiving a call from a program programmed in a high level programming language and executed on the mainframe computer, to execute a user channel program, wherein the user channel program may refer to any location within the required area of the storage volume; and processing the user channel program to obtain channel command words and provide the channel command words to Execute Channel Program (EXCP). Within the method, the high level programming language is optionally Java. Within the method, the call from the program is optionally received and processed by code implemented in a high level programming language. Within the method, code implemented in high level programming language optionally provides the channel command words to an assembly code unit which calls EXCP. Within the method, obtaining access to the required area of the storage volume optionally comprises obtaining supervisor privileges. Within the method, opening the storage volume optionally comprises building Data Control Block (DCB) and Data Extent Block (DEB) data structures. Within the method, obtaining access to the required area of the storage volume optionally comprises setting start CCHH and end CCHH fields of the DEB to boundaries of the required area.

Another exemplary embodiment of the disclosed subject matter is a computerized apparatus having a processor, the processor being adapted to perform the steps of: opening a storage volume associated with a mainframe computer executing z/OS operating system; obtaining access to a required area of the storage volume; receiving a call from a program programmed in a high level programming language and executed on the mainframe computer, to execute a user channel program, wherein the user channel program may refer to any location within the required area of the storage volume; and processing the user channel program to obtain channel command words and provide the channel command words to Execute Channel Program (EXCP). Within the apparatus the call from the program is optionally received and processed by code implemented in a high level programming language. Within the apparatus, the high level programming language is optionally Java. Within the apparatus, the code implemented in a high level programming language optionally comprises a header and implementation. Within the apparatus the high level programming language is optionally C. Within the apparatus, the code implemented in high level programming language optionally provides the channel command words to an assembly code unit which calls the EXCP. Within the apparatus, the processor may be further adapted to obtain supervisor privileges for obtaining access to the required area of the storage volume. Within the apparatus, opening the storage volume optionally comprises building Data Control Block (DCB) and Data Extent Block (DEB) data structures. Within the apparatus, obtaining access to the required area of the storage volume optionally comprises setting start and end fields of the DEB to boundaries of the required area.

Yet another exemplary embodiment of the disclosed subject matter is a computer program product comprising a computer readable storage medium retaining program instructions, which program instructions when read by a processor, cause the processor to perform a method comprising: opening a storage volume associated with a mainframe computer executing z/OS operating system; obtaining access to a required area of the storage volume; receiving a call from a program programmed in a high level programming language and executed on the mainframe computer, to execute a user channel program, wherein the user channel program may refer to any location within the required area of the storage volume; and processing the user channel program to obtain channel command words and provide the channel command words to Execute Channel Program (EXCP). Within the computer program product, the program instructions optionally comprise: a code unit programmed in high level programming language for processing a channel program; and an assembly code unit for providing the channel command words to EXCP. Within the computer program product, the code unit programmed in high level programming language optionally comprises a header and an implementation. Within the computer program product, the high level programming language is optionally Java.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 3B is a listing of statements for re-linking Java 7 31-bit code such that it can request and receive supervisor privileges, in accordance with some exemplary embodiments of the subject matter;

FIG. 5 shows code listing for performing some steps of the method of FIG. 4, in accordance with some exemplary embodiments of the subject matter.

DETAILED DESCRIPTION

Figure 1:
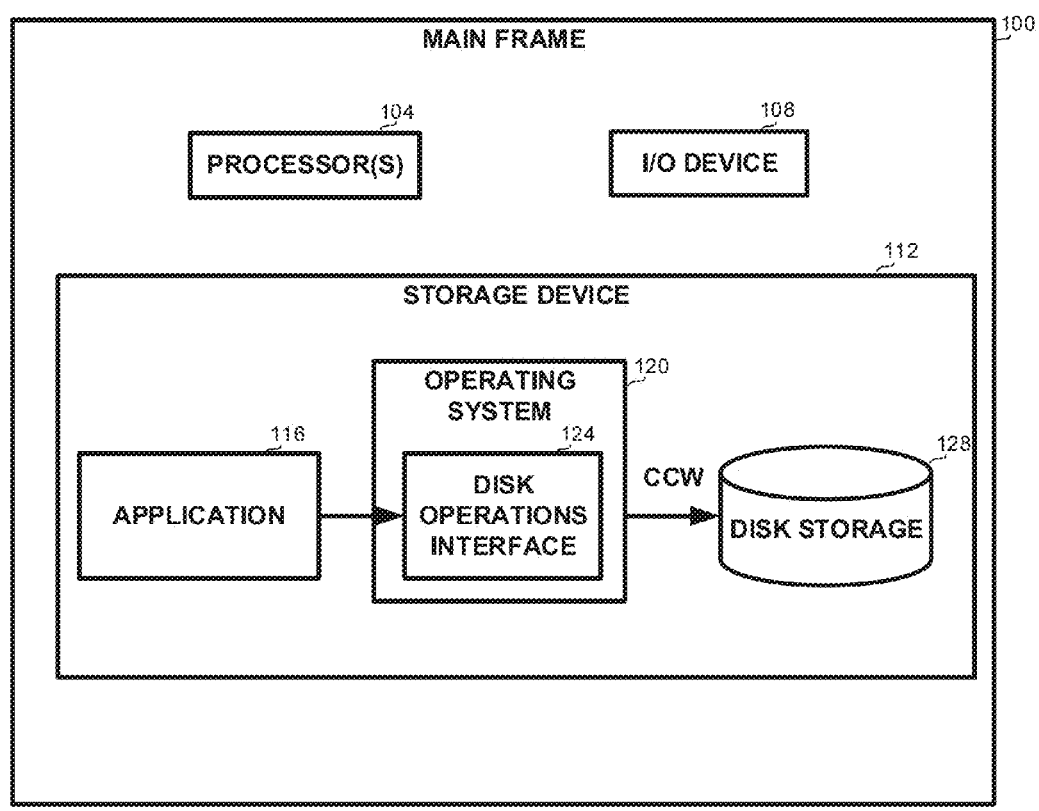
FIG. 1 shows a schematic block diagram of a mainframe computer executing disk operations.

One technical problem dealt with by the disclosed subject matter is the difficulty of developing computer programs that perform disk operations, for mainframe (MF) computers.

Currently, mainframe computers, and particularly those using the z/OS operating system, put heavy limitations on applications that need to write or read data from or to a disk. Disk operations can only be performed by interfacing the Execute Channel Program (EXCP), which implements supervisor calls for low-level device access.

Mainframe computers may use channel programs to store or retrieve data. Channel programs may be executed by a separate processor than the CPU, called I/O Processor (IOP) or System Assist Processor (SAP). The IOP may reside in a physical part of the Mainframe computer referred to as the I/O Channel Subsystem. A channel program is a sequence of channel command words (CCWs) which are executed by the I/O channel subsystem. The operating system signals the I/O channel subsystem to begin executing the channel program with an SSCH (start sub-channel) instruction. The central processor is then free to proceed with non-I/O instructions until interrupted. When the channel operations are complete, the channel interrupts the central processor with an I/O interruption.

A programmer is responsible for providing the channel program in assembly language, as a list of device-specific channel command words (CCWs), to be executed by I/O channels, control units and devices.

A first limitation of using disk operation is that only z/OS applications coded in assembly language can interface the EXCP, thus eliminates using modern programming environments for writing mainframe programs in high level languages such as Java, which strictly limits the number of programmers capable of writing such programs, and hence the variety of available programs and applications.

Another limitation is that the EXCP only provides for low level disk operations, wherein the reading and writing are done in tracks and not in whole disk level. This, for example, limits the availability of backup and restore for large amounts of data.

Even further, only one read/write operation can be performed at a time. Thus, multiple programs, or one program comprising a multiplicity of tracks, cannot read or write simultaneously to or from different parts of the disk.

Yet another limitation is that some functions of the EXCP interface require the program to execute in Supervisor state. However, it is not possible to assume supervisor state from within Java program.

These limitations severely restrict not only developing new programs and applications for mainframe computers, but also the porting of programs available for other platforms.

One technical solution comprises providing assembly code that calls the EXCP program in accordance with received parameters. The assembly code is responsible for obtaining the required privileges, and enabling disk operations for the whole disk or any required part thereof, as disclosed hereinbelow.

In addition, the javah utility of the Java framework may be used to create Java Native Interface (JNI) headers for calling native methods, such as readTrack( ), readFullCylinder( ), writeTrack( ), writeFullCylinder( ), or others. A corresponding implementation may be provided for the headers. In some exemplary embodiments, the interface and implementation may be provided in a high level programming language, such as C. The interface and implementation may be used for implementing user-provided channel programs, which can be used by one or more user applications.

The implementation of the channel programs calls the assembly code, which calls the EXCP, such that calling the JNI method from any program or application provides for conveniently accessing the disk operations without the limitations discussed above.

It will be appreciated that beyond the functionality provided by the JNI headers and implementation as supplied for example by a third party external to an organization, further functionality can be added in a similar manner by any user, such as an IT department of a corporate, by programming further headers and implementations.

The added functionality may provide for reading and writing high level entities such as files, folders, or full disks, for example for backup and restore operations, multiple concurrent disk accesses and other functionality.

One technical effect of the disclosed subject matter provides for calling disk operations from programs written in high level programming languages rather than assembly, thus making programming these programs easier, faster and in conformance with modern programming paradigms, such as object oriented programming.

Another technical effect of the disclosed subject matter is the enablement of providing and calling higher level disk operations, wherein such operations may relate to logical storage entities, such as files or folders rather than physical entities such as tracks and sectors to be utilized by such programs, regardless of the physical structure of the storage device.

These effects improve the operation of the computer itself, by easing the burden associated with programming programs and applications, thus enabling easier programming of user programs and applications which may easily be executed by the computer. Also, by enabling accesses to the disk from multiple threads or processes, the efficiency of each program accessing the disk increases significantly, and so does the efficiency of the system as a whole. In particular, backup and restore operations may become much easier and faster.

Yet another technical effect of the disclosed subject matter is the availability of endless programs developed for other platforms which, once the required interfaces are implemented, can be easily ported for and executed on mainframe computers once high level disk operations have become available.

Referring now to FIG. 1, showing a schematic block diagram of mainframe computer executing programs that perform disk operations.

A mainframe computer 100 has a processor 104 which may be a Central Processing Unit (CPU), a microprocessor, an electronic circuit, an Integrated Circuit (IC), a Central Processor (CP), a System z Information Integration Processor (zIIP), a System z Application Assist Processor (zAAP), or the like. Processor 104 may be utilized to perform computations required by the apparatus or any of its sub-components.

In some exemplary embodiments of the disclosed subject matter, mainframe 100 may comprise one or more Input/Output (I/O) device 108 such as a display, a pointing device, a keyboard, a touch screen, terminal, card reader, puncher, printer, or the like. I/O device 108 may be utilized to provide output to and receive input from a user.

In some exemplary embodiments of the disclosed subject matter, mainframe 100 may comprise one or more storage devices 112. Storage device 112 may be a hard disk drive, a Flash disk, a Random Access Memory (RAM), a memory chip, real storage, main storage or the like. In some exemplary embodiments, storage device 108 may retain program code operative to cause processor 104 to perform acts associated with any of the programs executed by mainframe 100. The components detailed below may be implemented as one or more sets of interrelated computer instructions, executed for example by processor 104 or by another processor. The components may be arranged as one or more executable files, dynamic libraries, static libraries, methods, functions, services, or the like, programmed in any programming language and under any computing environment.

Storage device 112 may have application 116 stored on a permanent storage device. Application 116 may then be loaded to a volatile storage device when executed. Storage device 112 may also store operating system 120, such as the z/OS operating system, which is also loaded to a volatile storage device and provides services to executed applications. These services may include disk operation services 124. Thus, application 116 may call services of operating system 120, and in particular disk operation services 124 in order to write or read to or from disk storage 128. Disk storage 128 may be implemented as part of or external to storage device 112, or even external to mainframe 100.

Figure 2:
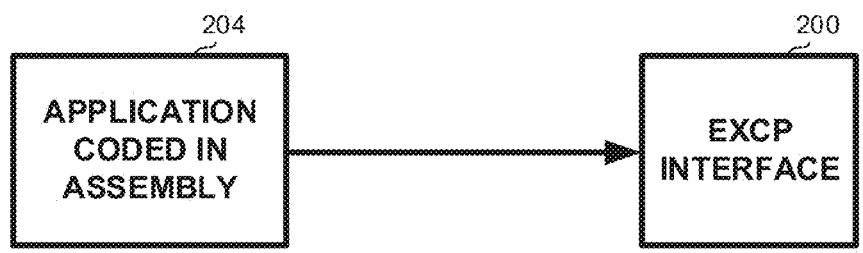
FIG. 2 is schematic call chain diagram for performing disk operations, in prior art systems.

However, under current limitations of disk operation services 124, and as shown in FIG. 2, application 116, or at least the module that calls disk operation services 124 must be programmed in assembly, which makes it much harder to develop new applications. Additionally, application 116 must assume supervisor privileges in order to use disk operation services 124.

Referring now to FIG. 2, showing a schematic call chain diagram when performing disk operations, in prior art embodiments.

Application 208, which is equivalent to application 116 of FIG. 1, uses disk access services EXCP 204 which implements disk operations interface 124 of FIG. 1. EXCP 204 then sends CCWs to the disk (not shown). As stated above, in order to use EXCP 204, application 208 has to be programmed in assembly, since disk operations of EXCP 204 cannot be accessed from programs in other languages, and application 208 cannot assume supervisor privileges unless it is programmed in assembly.

Figure 3A:
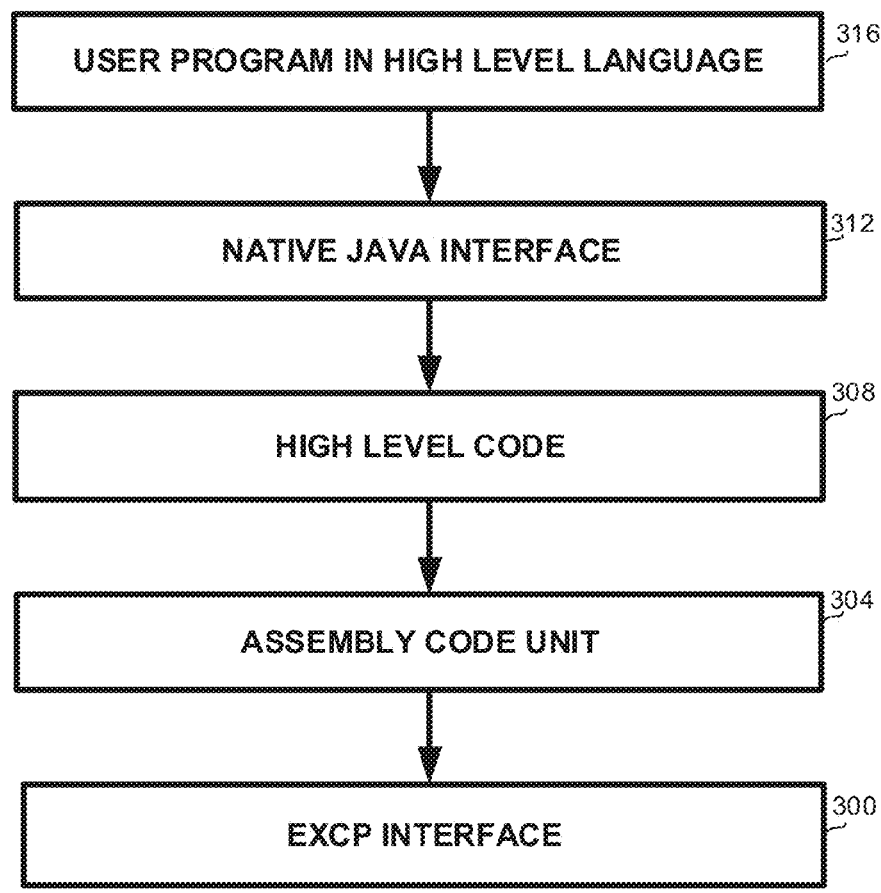
FIG. 3A is schematic call chain diagram when performing disk operations, in accordance with some exemplary embodiments of the subject matter.

Referring now to FIG. 3A, showing a schematic call chain diagram for calling channel programs, in accordance with some exemplary embodiments of the subject matter.

EXCP 300 is equivalent to EXCP 200, and can send CCWs to a disk device (not shown). In accordance with the disclosed subject matter EXCP 300 can be called from a dedicated assembly code unit 304, in accordance with parameters received from code provided in a high level language.

At the beginning of a process, assembly code unit 304 may call the OPEN system service, in order to build Data Control Block (DCB) and Data Extent Block (DEB) data structures for a temporary data set on the storage volume, wherein the DCB is a logical description of a data set in a program and the DEB is a physical description the data set. The volume may be opened with non-exclusive privileges, to allow multiple threads or programs to access the required area Assembly code unit 304 may then request supervisor privileges. These privileges may be provided, since code unit 304 is indeed coded in assembly as required by EXCP 300.

Assembly code unit 304, once obtained supervisor privileges, may then modify the DEB fields such that the whole storage volume, or any required part thereof, is mapped and is accessible. Then, when the EXCP interface is called, it checks the DEB which will now enable access to all required locations on the disk.

Additionally, Java Native Interface (JNI) headers 312, and corresponding implementations 308 may be provided, which declare and implement user channel programs, such as readTrack( ), readFullCylinder( ), writeTrack( ), writeFullCylinder( ) or others. JNI headers 312 and high level code 308 may be implemented in any high level language, such as C.

In order to let the program assume supervisor mode, the Java load module may be re-linked with the Authorization Code value of 1 'AC(1)' attribute, and saved in an Authorized Program Facility (APF) controlled library. The system may then accept requests to change to supervisor state from applications started with this Java load module.

Exemplary statements for re-linking Java 7 31-bit code such that it can request and receive supervisor privileges are listed in FIG. 3B:

Thus, Java Native Interface headers 312, and its high level implementation 308 enable a user program 316 programmed in high level language, for example Java, to use channel programs, such as readTrack( ), readFullCylinder( ), writeTrack( ), writeFullCylinder( ) and others.

Thus, any user program 316 coded in high level language may call channel programs, without being programmed in assembly, and while obtaining the appropriate privileges. Further, user program 316 may access the full volume or any required part thereof, with any one or more threads.

Figure 4:
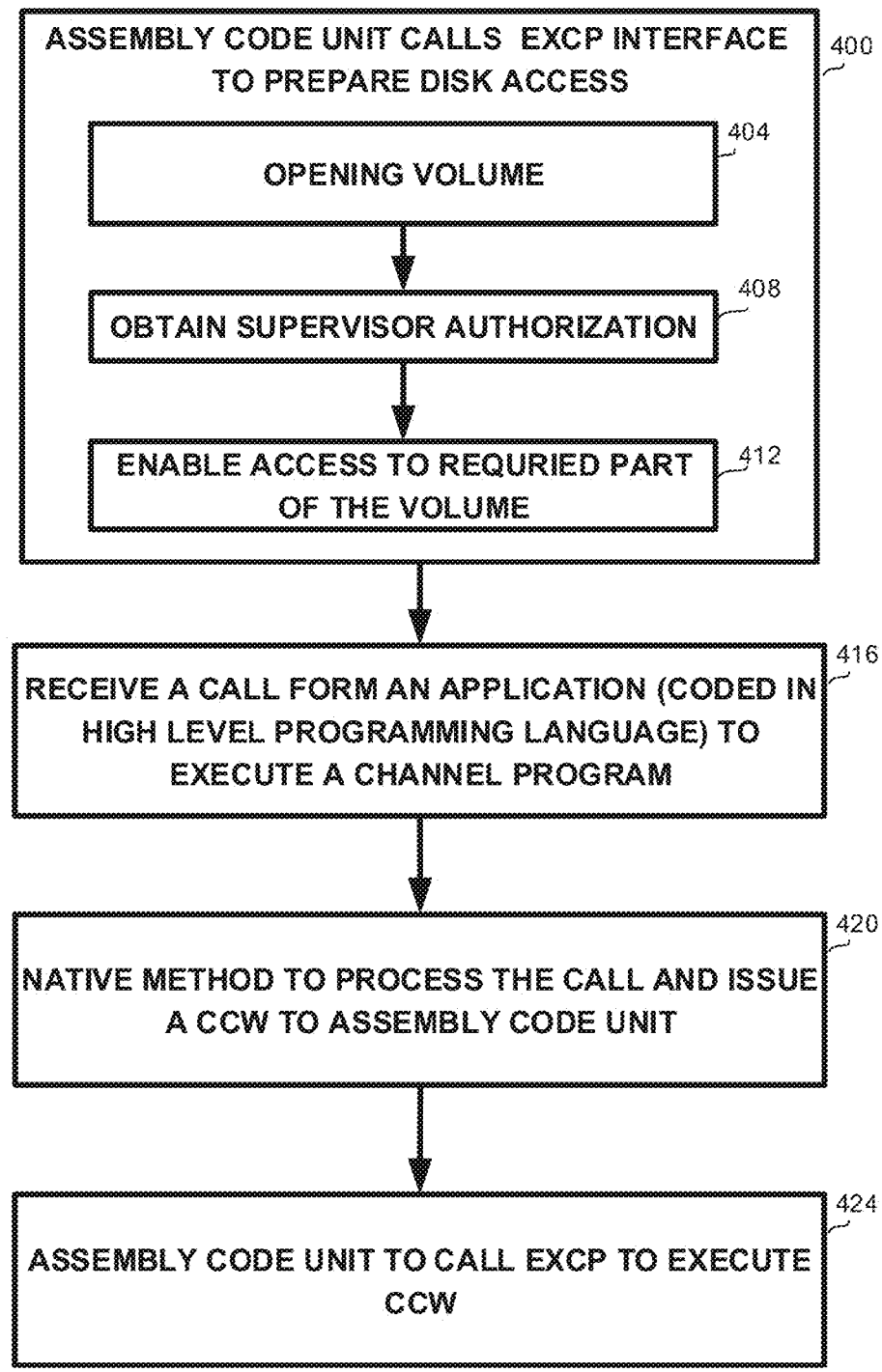
FIG. 4 is flowchart of steps in a method for performing disk operations, in accordance with some exemplary embodiments of the subject matter.

Referring now to FIG. 4, showing a flowchart of steps in a method for performing disk operations from a high level program, in accordance with some exemplary embodiments of the subject matter.

On step 400, assembly code unit, such as assembly code unit 304 calls the EXCP interface to prepare disk access. This may comprise steps 404, 408 and 412 detailed below:

On step 404, the assembly code unit may call the OPEN system service of EXCP 300 to open the volume, for example by building one or more data structures indicating accessible area on disk, such as DEB. The volume may be opened in a non-exclusive manner to enable multiple threads or processes to access the disk.

On step 408, the assembly code unit, called indirectly from a user program, may obtain supervisor privileges, for example by issuing a MODESET request to receive such privileges. The privileges may be granted if the used Java load module has been be linked with the Authorization Code value of 1 'AC(I)' attribute, and saved in an APF-authorized library.

On step 412, the assembly code unit may obtain access to any required part of the volume, for example the whole volume. This may be done by modifying the DEB fields indicating start and end of accessible volume, such that they point to the start cylinder and head number (CCHH) and end cylinder and head number (CCHH) to map the volume from start to end.

Exemplary code for performing steps 404 to 412 is listed in FIG. 5, wherein it will be appreciated that DCBE is an extension of the DCB.

On step 416, a call may be received from an application coded in high level programming language to execute a channel program. The call may be received by a native interface.

On step 420, the native method may process the call and issue CCWs based on the received channel program request. The CCWs may be issued to an assembly code unit.

On step 424 the assembly code unit may receive the CCWs and provide them to the EXCP which may execute them, wherein the CCWs may refer to any location on the disk, since the DEB has been modified to enable such access. The EXCP may check whether the address for the command is indeed within the DEB limits.

It will be appreciated that multiple threads or processes may access the disk at different areas, since the volume was opened in a non-exclusive manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   opening a storage volume associated with a mainframe computer executing z/OS operating system;
   obtaining access to a required area of the storage volume, wherein the method further comprises obtaining access to the required area of the storage volume by obtaining supervisor privileges, and wherein obtaining the supervisor privileges comprises linking a Java load module with an Authorization Code value of 1 'AC(1)' attribute, and saving in an Authorized Program Facility (APF) controlled library;
   receiving a call from a program programmed in a high level programming language and executed on the mainframe computer, to execute a user channel program, wherein the user channel program may refer to any location within the required area of the storage volume, wherein the call from the program is received and processed by code implemented in a second high level programming language which provides channel command words to an assembly code unit, wherein the assembly code unit calls the user channel program in response to the channel command words; and
   processing the user channel program to provide the channel command words to Execute Channel Program (EXCP).

2. The method of claim 1, wherein the high level programming language is Java and the second high level programming language is C.

3. The method of claim 1, wherein obtaining access to the required area of the storage volume comprises obtaining supervisor privileges.

4. The method of claim 1, wherein opening the storage volume comprises building Data Control Block (DCB) and Data Extent Block (DEB) data structures.

5. The method of claim 4, wherein obtaining access to the required area of the storage volume comprises setting start cylinder and head number CCHH and end cylinder and head number CCHH fields of the DEB to boundaries of the required area.

6. A computerized apparatus having a processor, the processor being adapted to perform the steps of:
   opening a storage volume associated with a mainframe computer executing z/OS operating system;
   obtaining access to a required area of the storage volume, wherein the processor is further adapted to obtain access to the required area of the storage volume by obtaining supervisor privileges, and wherein obtaining the supervisor privileges comprises linking a Java load module with an Authorization Code value of 1 'AC(1)' attribute, and saving in an Authorized Program Facility (APF) controlled library;
   receiving a call from a program programmed in a high level programming language and executed on the mainframe computer, to execute a user channel program, wherein the user channel program may refer to any location within the required area of the storage volume, wherein the call from the program is received and processed by code implemented in a second high level programming language which provides channel command words to an assembly code unit, wherein the assembly code unit calls the user channel program in response to the channel command words; and
   processing the user channel program to provide the channel command words to Execute Channel Program (EXCP).

7. The apparatus of claim 6, wherein the code implemented in a high level programming language comprises a header and implementation.

8. The apparatus of claim 6, wherein the second high level programming language is C.

9. The apparatus of claim 6 wherein the high level programming language is Java.

10. The apparatus of claim 6, wherein the processor is further adapted to obtain supervisor privileges for obtaining access to the required area of the storage volume.

11. The apparatus of claim 6, wherein opening the storage volume comprises building Data Control Block (DCB) and Data Extent Block (DEB) data structures.

12. The apparatus of claim 6 wherein obtaining access to the required area of the storage volume comprises setting start and end fields of the DEB to boundaries of the required area.

13. A computer program product comprising a computer readable storage medium retaining program instructions, which program instructions when read by a processor, cause the processor to perform a method comprising:

opening a storage volume associated with a mainframe computer executing z/OS operating system;

obtaining access to a required area of the storage volume, wherein the method further comprises obtaining access to the required area of the storage volume by obtaining supervisor privileges, and wherein obtaining the supervisor privileges comprises linking a Java load module with an Authorization Code value of 1 'AC(1)' attribute, and saving in an Authorized Program Facility (APF) controlled library;

receiving a call from a program programmed in a high level programming language and executed on the mainframe computer, to execute a user channel program, wherein the user channel program may refer to any location within the required area of the storage volume; and processing the user channel program to provide channel command words to Execute Channel Program (EXCP), and wherein the program instructions comprise:

a code unit programmed in a second high level programming language for processing the user channel program; and an assembly code unit for providing the channel command words to EXCP.

14. The computer program product of claim 13, wherein the code unit programmed in high level programming language comprises a header and an implementation.

15. The computer program product of claim 13, wherein the high level programming language is Java and the second high level programming language is C.

16. The method of claim 3, wherein obtaining supervisor privileges comprises linking a Java load module with an 'AC(1)' attribute, and saving in an Authorized Program Facility (APF) controlled library.

\* \* \* \* \*